United States Patent
Hirotomi et al.

(10) Patent No.: US 9,731,787 B2
(45) Date of Patent: *Aug. 15, 2017

(54) BICYCLE OPERATING DEVICE MOUNTING ASSEMBLY

(71) Applicant: Shimano Inc., Sakai, Osaka (JP)

(72) Inventors: Shinya Hirotomi, Osaka (JP); Kentaro Kosaka, Osaka (JP); Yoshimitsu Miki, Osaka (JP); Kazutaka Fukao, Osaka (JP); Takaaki Fujiwara, Osaka (JP)

(73) Assignee: Shimano Inc., Osaka (JP)

( * ) Notice: Subject to any disclaimer, the term of this patent is extended or adjusted under 35 U.S.C. 154(b) by 167 days.

This patent is subject to a terminal disclaimer.

(21) Appl. No.: 14/288,146

(22) Filed: May 27, 2014

(65) Prior Publication Data

US 2015/0000452 A1    Jan. 1, 2015

Related U.S. Application Data

(63) Continuation of application No. 13/930,344, filed on Jun. 28, 2013, now Pat. No. 9,511,815.

(51) Int. Cl.
*B62K 23/06* (2006.01)
*B62J 6/16* (2006.01)
*B62K 23/02* (2006.01)

(52) U.S. Cl.
CPC ............... *B62K 23/06* (2013.01); *B62J 6/16* (2013.01); *B62K 23/02* (2013.01); *Y10T 74/2028* (2015.01)

(58) Field of Classification Search
CPC ........... B60T 7/102; B62L 3/02; B62M 25/04; G05G 11/00; G05G 1/04; B62K 23/02; Y10T 74/20396; B62J 11/00; B62J 7/02; B62B 2/065

See application file for complete search history.

(56) References Cited

U.S. PATENT DOCUMENTS 6,146,298 A * 11/2000 Nanko .................... B62M 9/135
                                                        474/127
6,332,373 B1 * 12/2001 Iteya ........................ B62J 11/00
                                                        116/28.1

(Continued)

FOREIGN PATENT DOCUMENTS

EP    2 666 705 A1    11/2013
GB       622890    *    5/1949

(Continued)

OTHER PUBLICATIONS

USPTO STIC English translation of JP 01134591, Yoshigai, Sep. 13, 1989.*
Define protrusion Google Search, google.com., Jun. 23, 2016.*

*Primary Examiner* — Vinh Luong
(74) *Attorney, Agent, or Firm* — Global IP Counselors, LLP (57) ABSTRACT

A bicycle operating device mounting assembly is basically provided with a handlebar mounting clamp and an adapter member. The handlebar mounting clamp has a clamp opening. The adapter member includes at least a first part that is detachably disposed within the clamp opening. The first part is configured to be clamped between the handlebar mounting clamp and a handlebar as the handlebar mounting clamp is tightened in a state that the first part is disposed within the clamp opening.

15 Claims, 8 Drawing Sheets

(56) References Cited

U.S. PATENT DOCUMENTS

| | | | | |
|---|---|---|---|---|
| 7,857,112 B1* | 12/2010 | Tsai | ............. | B60T 11/18 |
| | | | | 188/344 |
| 8,061,667 B2 | 11/2011 | Weiss et al. | | |
| 9,073,595 B2 | 7/2015 | Miki et al. | | |
| 9,174,697 B2 | 11/2015 | Miki et al. | | |
| 2004/0045775 A1 | 3/2004 | Lavezzi | | |
| 2005/0274758 A1* | 12/2005 | Jefferson | ............. | B62J 1/167 |
| | | | | 224/425 |
| 2006/0029465 A1* | 2/2006 | Auer | ............. | B62J 11/00 |
| | | | | 403/383 |
| 2007/0258758 A1* | 11/2007 | Ho | ............. | F16B 2/10 |
| | | | | 403/398 |
| 2007/0284203 A1* | 12/2007 | Tetsuka | ............. | B62L 3/023 |
| | | | | 188/344 |
| 2009/0085766 A1 | 4/2009 | Seydoux et al. | | |
| 2010/0139442 A1 | 6/2010 | Tsumiyama | | |
| 2010/0224740 A1 | 9/2010 | Hirose et al. | | |
| 2011/0154939 A1* | 6/2011 | Watarai | ............. | B62K 23/06 |
| | | | | 74/491 |
| 2011/0253863 A1 | 10/2011 | Weiss et al. | | |
| 2012/0048660 A1* | 3/2012 | Moore | ............. | B60T 11/16 |
| | | | | 188/151 R |
| 2014/0026710 A1* | 1/2014 | Takeuchi | ............. | B62K 23/06 |
| | | | | 74/551.8 |
| 2015/0096400 A1 | 4/2015 | Miki et al. | | |
| 2015/0096406 A1 | 4/2015 | Miki et al. | | |
| 2017/0106934 A1* | 4/2017 | Ruopp | ............. | B62K 23/06 |

FOREIGN PATENT DOCUMENTS

| | | | |
|---|---|---|---|
| GB | 1587233 | * | 4/1981 |
| JP | 1-134591 U | | 9/1989 |

* cited by examiner

BICYCLE OPERATING DEVICE MOUNTING ASSEMBLY

BACKGROUND

Field of the Invention

This invention generally relates to a bicycle operating device mounting assembly. More specifically, the present invention relates to a bicycle operating device mounting assembly that is used to mount one or more bicycle operating devices to a handlebar.

Background Information

Bicycles are often provided with various bicycle operating devices that are mounted on the handlebar for actuating various bicycle components. For example, the handlebar often has a pair of brake operating devices and a pair of shifters mounted on the handlebar. The brake operating devices and the shifters are typically mounted adjacent the inner ends of the handlebar grips. Also in recent years, some bicycles are provided with additional user adjustable components such as a rear suspension, a front suspension and an adjustable seatpost. Typically, additional bicycle operating devices for these components are provided on the handlebar

SUMMARY

Generally, the present disclosure is directed to various features of a bicycle operating device mounting assembly that is used to mount one or bicycle operating devices to a handlebar.

In view of the state of the known technology and in accordance with a first aspect of the present invention, a bicycle operating device mounting assembly is provided that basically comprises a handlebar mounting clamp, an adapter member and a preventing structure. The handlebar mounting clamp has a clamp opening. The adapter member includes at least a first part that is detachably disposed within the clamp opening. The first part is configured to be clamped between the handlebar mounting clamp and a handlebar as the handlebar mounting clamp is tightened in a state that the first part is disposed within the clamp opening. The preventing structure is configured to prevent relative movement between the handlebar mounting clamp and the first part.

In accordance with a second aspect of the present invention, the bicycle operating device mounting assembly according to the first aspect is configured so that the preventing structure includes a tightening bolt configured to tighten the handlebar mounting clamp and a fixing part provided on the first part. The fixing part has an opening through which the tightening bolt extends.

In accordance with a third aspect of the present invention, the bicycle operating device mounting assembly according to the first aspect is configured so that the preventing structure includes one of a recess and a protrusion provided in the clamp opening and the other of the recess and the protrusion provided on the first part so as to engage with the one of the recess and the protrusion.

In accordance with a fourth aspect of the present invention, the bicycle operating device mounting assembly according to the first aspect is configured so that the first part has a semi-cylindrical part that is disposed in the clamp opening.

In accordance with a fifth aspect of the present invention, the bicycle operating device mounting assembly according to the fourth aspect is configured so that the first part has a projecting portion that projects from the semi-cylindrical part so as to be out of the clamp opening.

In accordance with a sixth aspect of the present invention, the bicycle operating device mounting assembly according to the fifth aspect further comprises a first operating device mounted on the handlebar mounting clamp.

In accordance with a seventh aspect of the present invention, the bicycle operating device mounting assembly according to the sixth aspect is configured so that the projecting portion has a mounting structure to mount a second operating device.

In accordance with an eighth aspect of the present invention, the bicycle operating device mounting assembly according to the seventh aspect is configured so that the mounting structure includes a mounting opening.

In accordance with a ninth aspect of the present invention, the bicycle operating device mounting assembly according to the first aspect is configured so that the adapter member further includes a second part being detachably disposed within the clamp opening. The second part is configured to be clamped between the handlebar mounting clamp and a handlebar as the handlebar mounting clamp is tightened in a state that the first and second parts are disposed within the clamp opening.

In accordance with a tenth aspect of the present invention, the bicycle operating device mounting assembly according to the ninth aspect is configured so that the first part and the second part are separate members with respect to the each other so as to be separately detachable from the handlebar mounting clamp.

In accordance with an eleventh aspect of the present invention, the bicycle operating device mounting assembly according to the tenth aspect is configured so that the first part has a semi-cylindrical part that is disposed in the clamp opening, and the second part has a semi-cylindrical part that is disposed in the clamp opening.

In accordance with a twelfth aspect of the present invention, a handlebar mounting clamp basically comprises a clamp opening and a preventing structure. The clamp opening is configured to receive an adapter member therein such that the handlebar mounting clamp clamps the adapter member together with a handlebar as the handlebar mounting clamp is tightened in a state that the adapter member is disposed within the clamp opening. The preventing structure is configured to prevent a movement of the adapter member.

In accordance with a thirteenth aspect of the present invention, the handlebar mounting clamp according to the twelfth aspect is configured so that the preventing structure includes one of a recess and a protrusion configured to engage with the other of the recess and the protrusion provided on the adapter member.

In accordance with a fourteenth aspect of the present invention, a bicycle operating device comprises the handlebar mounting clamp according to the twelfth aspect or thirteenth aspect.

In accordance with a fifteenth aspect of the present invention, the bicycle operating device according to the fourteenth aspect further comprises a cylinder housing configured to dispose a piston therein.

In accordance with a sixteenth aspect of the present invention, the bicycle operating device according to the fifteenth aspect further comprises a lever being pivoted relative to the handlebar mounting clamp and the cylinder housing to move the piston.

In accordance with a seventeenth aspect of the present invention, the bicycle operating device according to the fifteenth aspect further comprises a fluid reservoir tank being in fluid communication with the cylinder housing.

In accordance with an eighteenth aspect of the present invention, the bicycle operating device according to the seventeenth aspect is configured so that the cylinder housing and the fluid reservoir tank are integrally formed with the handlebar mounting clamp.

In accordance with a nineteenth aspect of the present invention, an adapter member for bicycle operating device mounting assembly is provided that basically comprises a first part and a preventing structure. The first part is configured to be detachably disposed within a clamp opening of a handlebar mounting clamp. The first part being configured to be clamped between the handlebar mounting clamp and a handlebar as the handlebar mounting clamp is tightened in a state that the first part is disposed within the clamp opening. The preventing structure is configured to prevent relative movement between the handlebar mounting clamp and the first part.

In accordance with a twentieth aspect of the present invention, the adapter member according to the nineteenth aspect is configured so that the preventing structure includes one of a recess and a protrusion provided on the first part.

In accordance with a twenty-first aspect of the present invention, the adapter member according to the nineteenth aspect is configured so that the first part has a semi-cylindrical part that is disposed in the clamp opening.

In accordance with a twenty-second aspect of the present invention, the adapter member according to the twenty-first aspect is configured so that the first part has a projecting portion that projects from the semi-cylindrical part so as to be out of the clamp opening.

In accordance with a twenty-third aspect of the present invention, the adapter member according to the twenty-second aspect is configured so that the projecting portion has a mounting structure to mount an operating device.

In accordance with a twenty-fourth aspect of the present invention, the adapter member according to the twenty-third aspect is configured so that the mounting structure includes a mounting opening.

Also other objects, features, aspects and advantages of the disclosed bicycle operating device mounting assembly will become apparent to those skilled in the art from the following detailed description, which, taken in conjunction with the annexed drawings, discloses one embodiment of the bicycle operating device mounting assembly.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
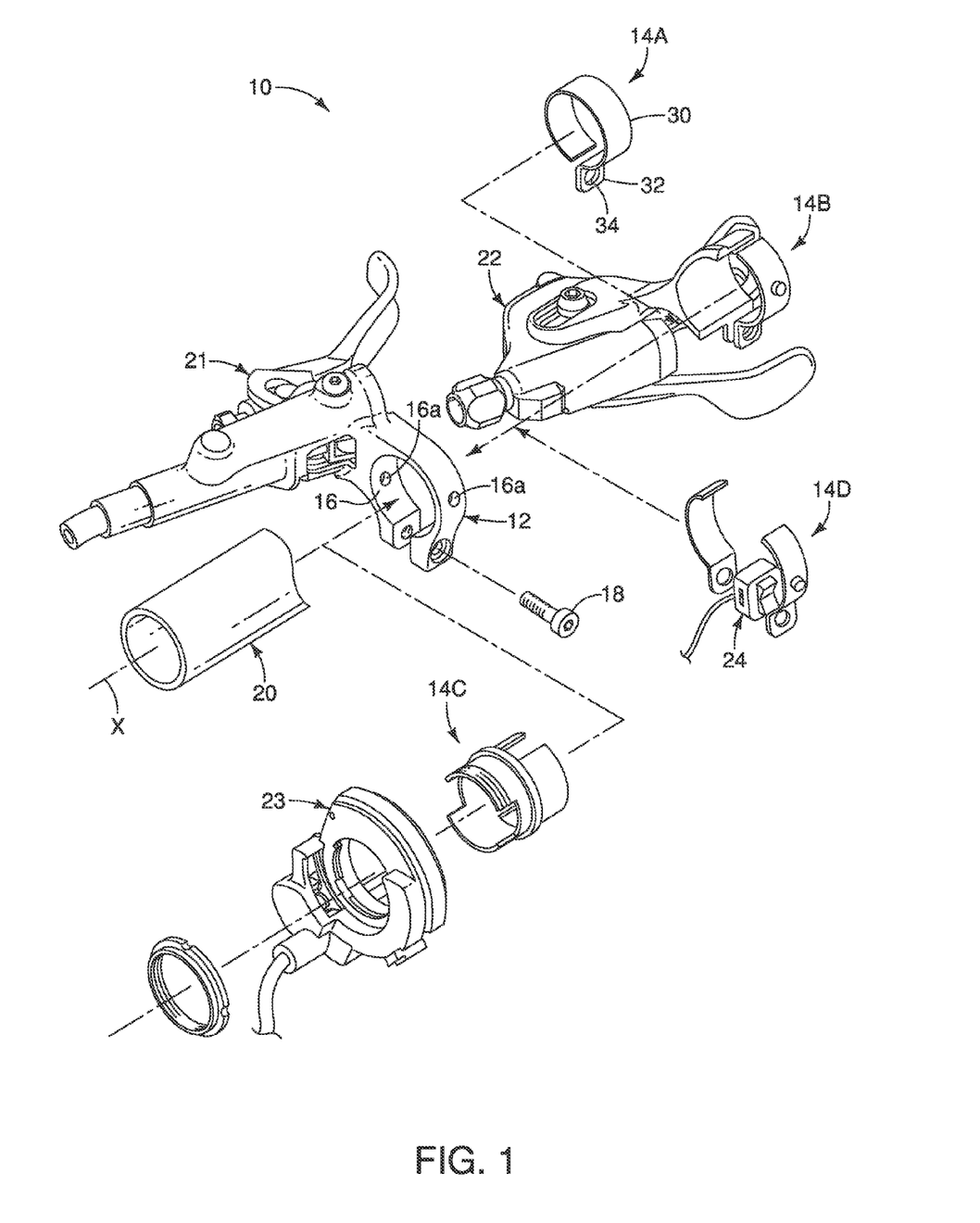
FIG. 1 is an exploded perspective view of a bicycle operating device mounting assembly showing various bicycle operating devices that can be arranged to form a plurality of configurations using various adapter members in accordance with one illustrated embodiment.
Figure 3:
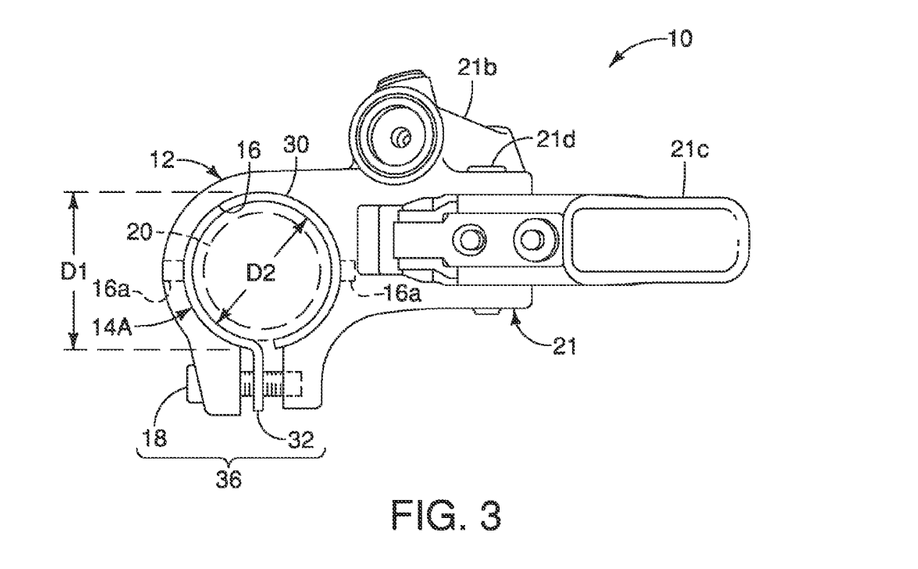
FIG. 3 is an elevational view of the bicycle operating device mounting assembly in the first configuration of FIG. 2 as viewed along the handlebar axis.

Referring initially to FIG. 1, an exploded perspective view of a bicycle operating device mounting assembly 10 showing various bicycle operating devices that can be arranged to form a plurality of configurations using various adapter members in accordance with one illustrated embodiment. The bicycle operating device mounting assembly 10 basically comprises a handlebar mounting clamp 12 and one of a plurality of adapter members 14A, 14B, 14C and 14D. The handlebar mounting clamp 12 has a clamp opening 16 that defines a first diameter D1 (FIG. 3). The first diameter D1 refers to a width dimension of the clamp opening 16 which is perpendicular to a handlebar axis X of a handlebar 20 while the handlebar mounting clamp 12 is in an unstressed state. The handlebar mounting clamp 12 preferably has a tightening bolt 18 or other tightening member that is configured to squeeze the handlebar mounting clamp 12 onto a handlebar 20 using one of the adapter members 14A, 14B, 14C and 14D. In other words, by tightening the tightening bolt 18, the free ends of the handlebar mounting clamp 12 are squeezed together so as to reduce the first diameter D1 by a slight amount. The handlebar mounting clamp 12 is preferably a cast metal member or a forged metal member with a very limited range of elastic deformation. In illustrated embodiment, the handlebar 20 is a flat handlebar that is used for mountain and city bicycles and has a lever/grip size of 22.2 millimeters in diameter. Thus, in illustrated embodiment, the handlebar mounting clamp 12 is configured to be used with flat handlebars. Although the handlebar mounting clamp 12 is shown as a non-hinged ring clamp in this embodiment, the handlebar mounting clamp 12 can be constructed as a hinged mounting clamp if needed and/or desired.

The first diameter D1 of the clamp opening 16 is an oversized opening with respect to a standard lever/grip size of the handlebar 12. In other words, the handlebar mounting clamp 12 is dimension such that the handlebar mounting clamp 12 cannot be secured onto the handlebar 20 without using one of the adapter members 14A, 14B, 14C and 14D to compensate for the oversized clamp opening 16, or without plastically deforming or otherwise damaging the handlebar mounting clamp 12. In illustrated embodiment, the handlebar 20 being the flat handlebar has a standard lever/grip size of 22.2 millimeters in diameter. Thus, the first diameter D1 of the clamp opening 16 is greater than 24 millimeters. Incidentally, standard road handlebars (including dropdown, track, cyclocross and touring bars) have a standard lever/grip size of 23.8 millimeters in diameter. Thus, if the handlebar mounting clamp 12 was configured for road handlebars, then the first diameter D1 of the clamp opening 16 is greater than 26 millimeters.

Still referring mainly to FIG. 1, the bicycle operating device mounting assembly 10 further comprises a brake operating device 21 as a first operating device that is mounted on the handlebar mounting clamp 12. Also the bicycle operating device mounting assembly 10 further comprises one of a mechanical operating device 22, a first electric operating device 23 and a second electric operating device 24 as a second operating device. As will be explained later, the mechanical operating device 22 and the second electric operating device 24 can be used together with the handlebar mounting clamp 12 as second and third operating devices of the bicycle operating device mounting assembly 10.

Figure 2:
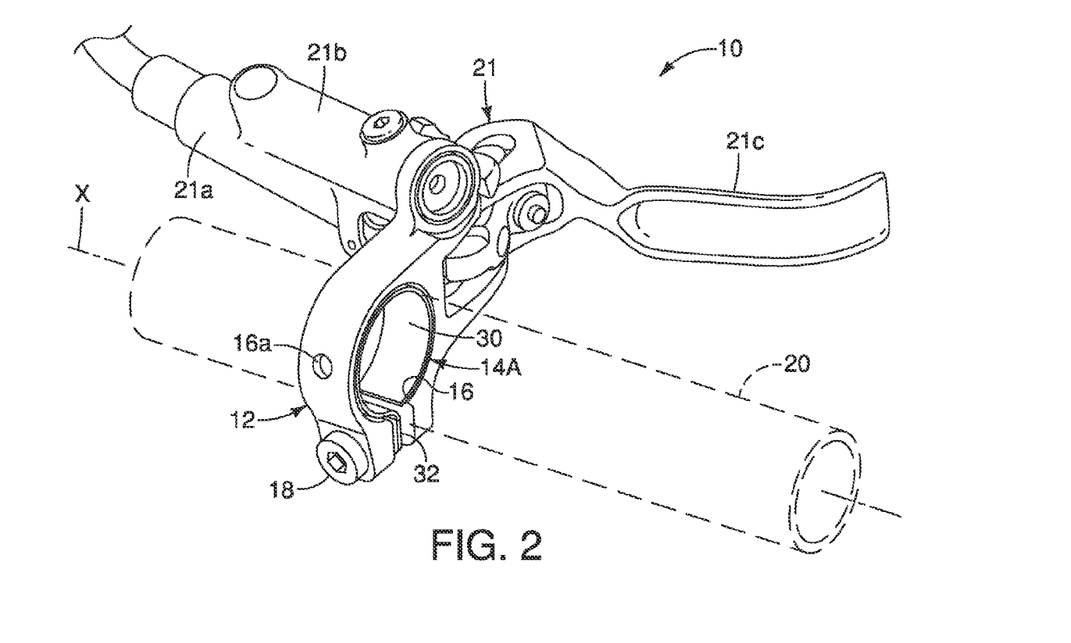
FIG. 2 is a perspective view of the bicycle operating device mounting assembly in a first configuration in which a first operating device (i.e., a brake operating device) is mounted on a handlebar mounting clamp, and in which a first adapter member is used for mounting the handlebar mounting clamp on a handlebar.

Referring to FIGS. 1 to 3, here, the brake operating device 21 (e.g., the first operating device) is integrally formed as a one-piece, unitary member with the handlebar mounting clamp 12. The brake operating device 21 includes a cylinder housing 21a, a fluid reservoir tank 21b and a lever 21c. The cylinder housing 21a and the fluid reservoir tank 21b is integrally formed with the handlebar mounting clamp 12. The lever 21c pivotally mounted on the cylinder housing 21a via a pivot pin 21d (FIG. 3). The lever 21c is pivoted relative to the handlebar mounting clamp 12 and the cylinder housing 21a to move a piston (not shown) disposed inside the cylinder housing 21a to pressurize hydraulic fluid to operate a brake device (not shown) that is fluidly connected to a master cylinder (not shown) of the cylinder housing 21a. More details on the general construction and operation of the brake operating device 21 are disclosed in U.S. patent application Ser. No. 13/902,910 (Shimano Inc.). Since hydraulic brake actuating devices such the one illustrated herein are well known in the bicycle field, the hydraulic brake actuating device formed by the brake operating device 21 (i.e., the first operating device) will not be discussed and/or illustrated in further detail herein. The brake operating device 21 can be constructed as a separate device with respect to the handlebar mounting clamp 12 so as to be detachably attached to the handlebar mounting clamp 12, if needed and/or desired. Further, the brake operating device 21 can be configured to operate a Bowden-type brake cable, which includes an outer case and an inner wire, if needed and/or desired.

Referring to back to FIG. 1, for the sake of clarity, the adapter members 14A, 14B, 14C and 14D will be hereinafter referred to as first, second, third and fourth adapter members 14A, 14B, 14C and 14D, respectively. In illustrated embodiment, the first, second, third and fourth adapter members 14A, 14B, 14C and 14D are used to reduce the dimension of the clamp opening 16 from the first diameter D1 to close to 22.2 millimeters since the handlebar mounting clamp 12 is configured to be used with mountain or city handlebars having a standard lever/grip size of 22.2 millimeters in diameter. The first adapter member 14A is used when it is desired to only have the brake operating device 21 mounted on the handlebar mounting clamp 12 such that a first configuration of the bicycle operating device mounting assembly 10 is obtained. The second adapter member 14B is used when it is desired to mount the mechanical operating device 22 to the handlebar mounting clamp 12 such that a second configuration of the bicycle operating device mounting assembly 10 is obtained. The third adapter member 14C is used when it is desired to mount the first electric operating device 23 to the handlebar mounting clamp 12 such that a third configuration of the bicycle operating device mounting assembly 10 is obtained. The fourth adapter member 14D is used when it is desired to mount the second electric operating device 24 to the handlebar mounting clamp 12 such that a fourth configuration of the bicycle operating device mounting assembly 10 is obtained. As will be explained later, parts of the second and fourth adapter members 14B and 14D are used together when it is desired to mount the mechanical operating device 22 and the second electric operating device 24 to the handlebar mounting clamp 12 such that a fifth configuration of the bicycle operating device mounting assembly 10 is obtained.

Referring now to FIGS. 1 to 3, the first configuration of the bicycle operating device mounting assembly 10 will now be explained in more detail. As mentioned above, the first adapter member 14A is used when it is desired to only have the brake operating device 21 mounted on the handlebar mounting clamp 12. The first adapter member 14A includes a connecting portion 30 and a fixing part 32. The connecting portion 30 is detachably disposed within the clamp opening 16. The connecting portion 30 has a second diameter D2 that is smaller than the first diameter D1. Thus, the connecting portion 30 reduces the dimension of the clamp opening 16 from the first diameter D1 to close to 22.2 millimeters in the illustrated embodiment. The outer diameter of the connecting portion 30 is identical or slightly smaller than the first diameter D1 so that the connecting portion 30 fits snugly in the clamp opening 16. The connecting portion 30 has a partial, cylindrical shape that extends about three hundred fifty-five degrees. The connecting portion 30 is configured to clamp the handlebar 20 as the handlebar mounting clamp 12 is tightened in a state that the connecting portion 30 is disposed within the clamp opening 16. The fixing part 32 is integrally formed with the connecting portion 30 as a one-piece, unitary member. The fixing part 32 has an opening 34 through which the tightening bolt 18 extends.

As seen in FIGS. 2 and 3, the bicycle operating device mounting assembly 10 further comprises a preventing structure 36 that is configured to prevent relative movement between the handlebar mounting clamp 12 and the connecting portion 30 of the first adapter member 14A. In the first configuration of the bicycle operating device mounting assembly 10, the preventing structure 36 includes the tightening bolt 18, which is configured to tighten the handlebar mounting clamp 12, and the fixing part 32 that is provided on the connecting portion 30. As mentioned above, the fixing part 32 has the opening 34 through which the tightening bolt 18 extends. Thus, when the connecting portion 30 is located in the clamp opening 16 and the tightening bolt 18 extends through the opening 34 of the fixing part 32, relative movement between the handlebar mounting clamp 12 and the connecting portion 30 of the first adapter member 14A is prevented.

Figure 4:
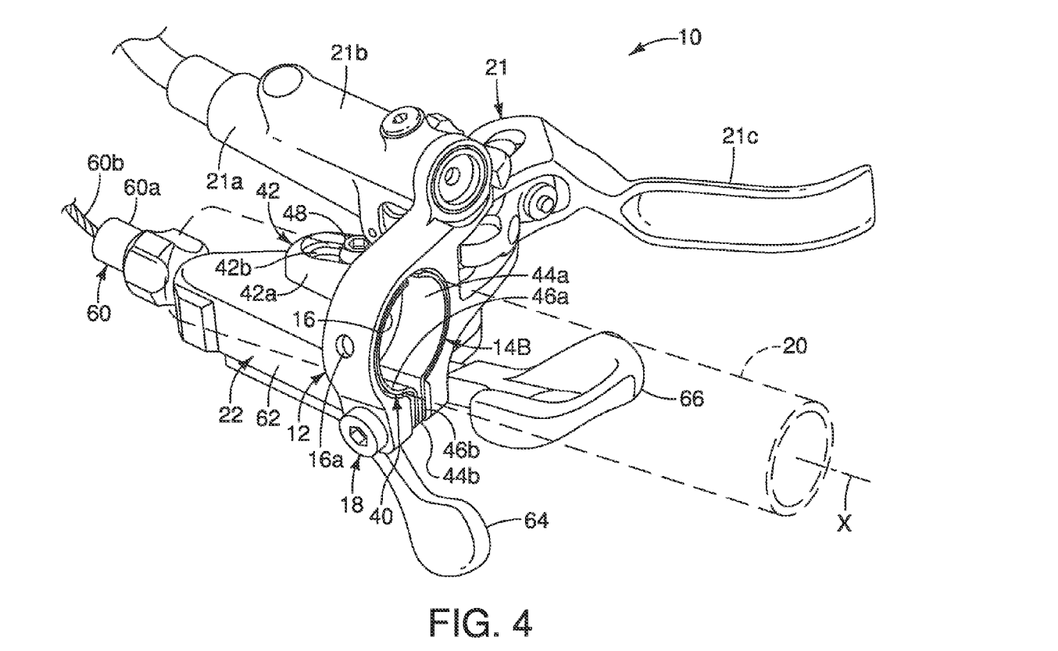
FIG. 4 is a perspective view of the bicycle operating device mounting assembly in a second configuration in which the first operating device (i.e., a brake operating device) is mounted on the handlebar mounting clamp, and in which a second adapter member is used for both mounting the handlebar mounting clamp on the handlebar and mounting a second operating device (i.e., a mechanical operating device)
Figure 5:
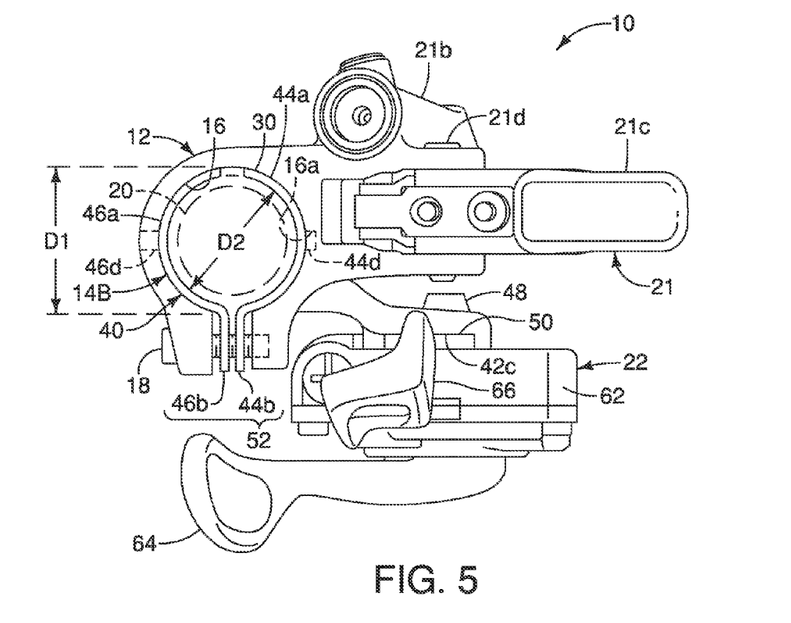
FIG. 5 is an elevational view of the bicycle operating device mounting assembly in the second configuration of FIG. 4 as viewed along the handlebar axis.
Figure 6:
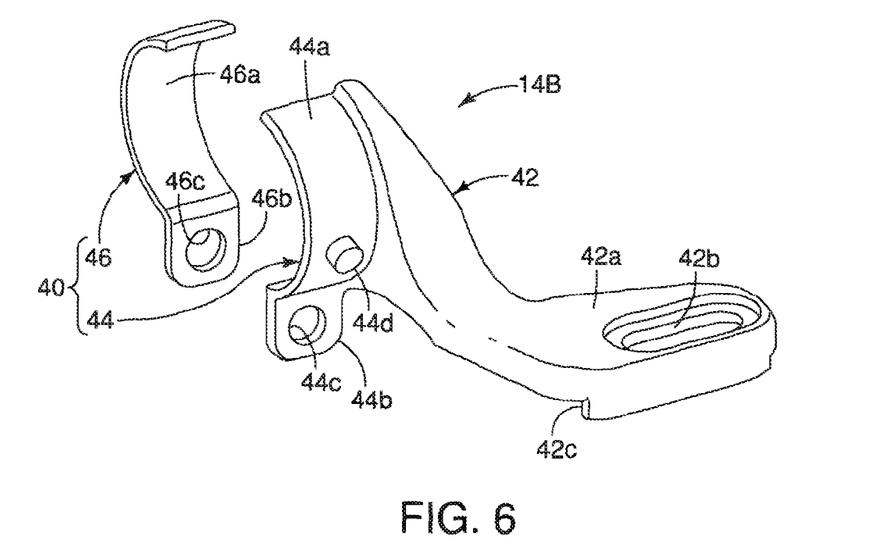
FIG. 6 is a first perspective view of the second adapter member that is used in the second configuration of the bicycle operating device mounting assembly as illustrated in FIGS. 4 and 5.
Figure 7:
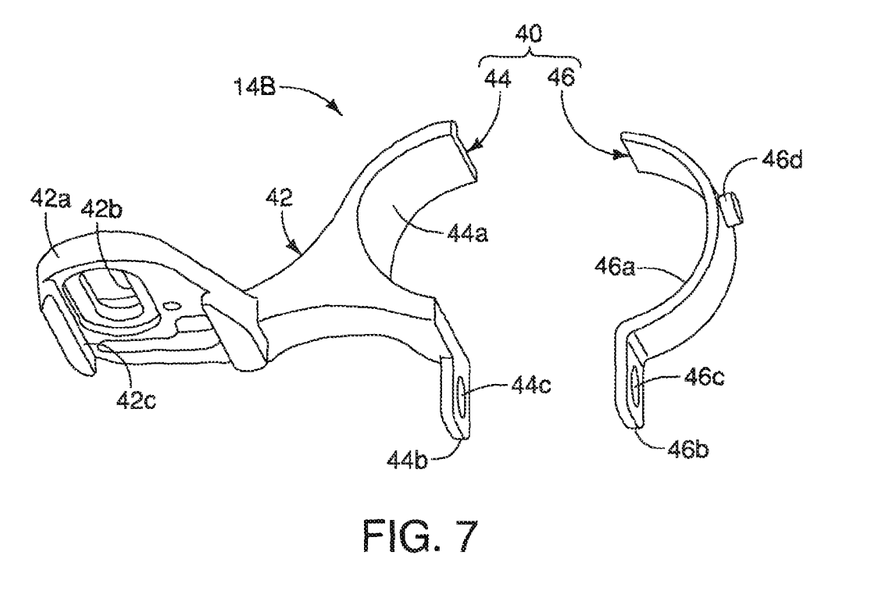
FIG. 7 is a second perspective view of the second adapter member that is used in the second configuration of the bicycle operating device mounting assembly as illustrated in FIGS. 4 and 5.

Referring now to FIGS. 4 to 7, the second configuration of the bicycle operating device mounting assembly 10 will now be explained in more detail. As mentioned above, the second adapter member 14B is used when it is desired to mount the mechanical operating device 22 to the handlebar mounting clamp 12. The second adapter member 14B includes a connecting portion 40 and a projecting portion 42. The connecting portion 40 is detachably disposed within the clamp opening 16. The projecting portion 42 projects from the clamp opening 16 while the connecting portion 40 of the second adapter member 14B is in the installed position within the clamp opening 16 as seen in FIGS. 4 and 5. The connecting portion 40 has a second diameter D2 that is smaller than the first diameter D1 of the clamp opening 16. Thus, the connecting portion 40 reduces the dimension of the clamp opening 16 from the first diameter D1 to close to 22.2 millimeters in the illustrated embodiment. The connecting portion 40 is configured to clamp the handlebar 20 as the handlebar mounting clamp 12 is tightened in a state that the connecting portion 40 is disposed within the clamp opening 16.

The connecting portion 40 of the second adapter member 14B includes a first part 44 from which the projecting portion 42 projects, and a second part 46 separately formed with respect to the first part 44. The first part 44 and the second part 46 have semi-cylindrical parts 44a and 46a, respectively, which extend about one hundred seventy-five degrees. Thus, the first part 44 and the second part 46 cannot be mounted and clamp the handlebar 20 themselves respectively. The first part 44 and the second part 46 have fixing parts 44b and 46b, respectively. The fixing parts 44b and 46b have openings 44c and 46c, respectively, through which the tightening bolt 18 extends. The second diameter D2 of the connecting portion 40 is determined while the first and second parts 44 and 46 are disposed in the clamp opening 16 against the handlebar mounting clamp 12 with the tightening bolt 18 loose.

The projecting portion 42 has a mounting structure 42a to mount the mechanical operating device 22 (e.g., a second operating device). In particular, the projecting portion 42 projects from the first part 44, and has the mounting structure 42a to mount the mechanical operating device 22 (e.g., a second operating device). The mounting structure 42a includes a mounting opening 42b. The mounting opening 42b is elongated in a direction that is parallel to the handlebar axis X such that the mechanical operating device 22 can be adjusted relative to the handlebar mounting clamp 12 in a direction parallel to the handlebar axis X. As seen in FIGS. 4 and 5, a bolt 48 is used to attach the mechanical operating device 22 to the mounting structure 42a of the projecting portion 42. In particular, the bolt 48 extends through the mounting opening 42b, and is screwed into the mechanical operating device 22. Preferably, the mounting structure 42a further includes a groove 42c that receives a rib 50 of the mechanical operating device 22 to prevent rotation of the mechanical operating device 22 on the bolt 48 relative to the mounting structure 42a.

As seen in FIGS. 4 to 7, the bicycle operating device mounting assembly 10 further comprises a preventing structure 52 that is configured to prevent relative movement between the handlebar mounting clamp 12 and the connecting portion 40 of the second adapter member 14B. In the second configuration of the bicycle operating device mounting assembly 10, the preventing structure 52 includes the tightening bolt 18, which is configured to tighten the handlebar mounting clamp 12, and the fixing parts 44b and 16h that are provided on the first and second parts 44 and 46 of the connecting portion 40. The preventing structure 52 further includes at least one of a recess 16a and a protrusion 44d, 46d provided in the clamp opening 16 and the other of the recess 16a and the protrusion 44d, 46d provided on the connecting portion 40 so as to engage the one of the recess 16a and the protrusion 44d, 46d In illustrated embodiment, the protrusions 44c and 46c are provide on each of the semi-cylindrical parts 44a and 46a, respectively, while two of the recesses 16a are provided in the clamp opening 16 of the handlebar mounting clamp 12.

The mechanical operating device 22 is configured to operate a bicycle component using a control cable 60 having an outer case 60a and an inner wire 60b. The mechanical operating device 22 basically includes a housing 62, a first lever 64 and a second lever 66. The first and second levers 64 and 66 are pivotally mounted to the housing 62. The housing encloses a wire takeup member that is rotated in a first direction to pull the inner wire 60b as the first lever 64 is operated. The wire takeup member is rotated in a second direction, which is opposite the first direction, to release the inner wire 60b as the second lever 66 is operated. Since mechanical operating devices, such as the mechanical operating device 22, are well known in the bicycle field, the mechanical operating device 22 will not be discussed and/or illustrated in detail herein. For example, the mechanical operating device 22 can be constructed similar to the electric shift operating device that is disclosed in U.S. Patent Application Publication No. 2013/0081507 A1 (Shimano Inc.).

Figure 8:
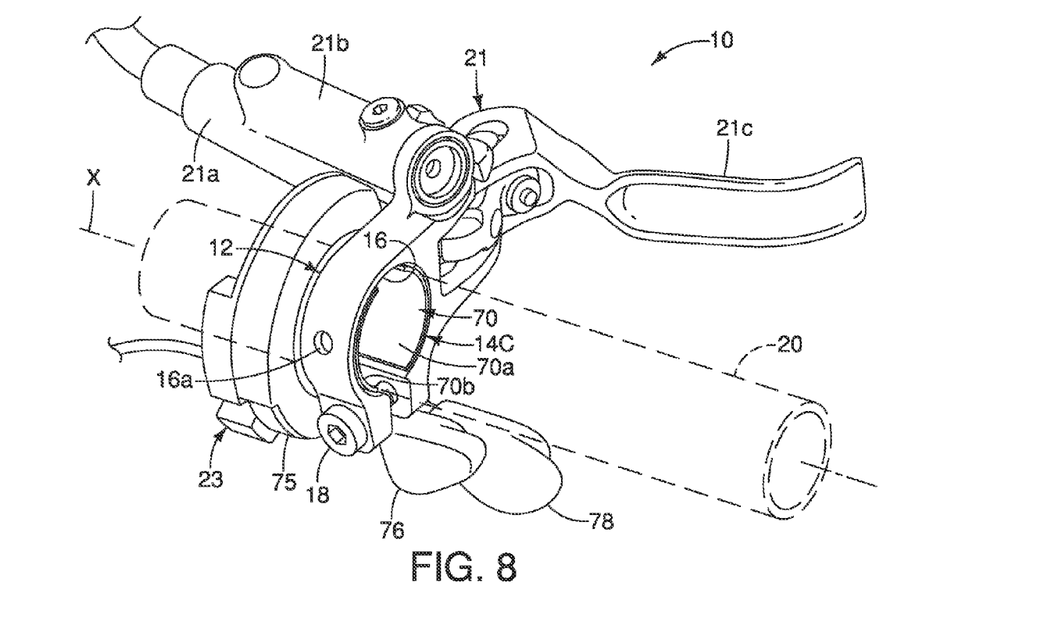
FIG. 8 is a perspective view of the bicycle operating device mounting assembly in a third configuration in which the first operating device (i.e., a brake operating device) is mounted on the handlebar mounting clamp, and in which a third adapter member is used for both mounting the handlebar mounting clamp on the handlebar and mounting a second operating device (i.e., a first electric operating device)
Figure 9:
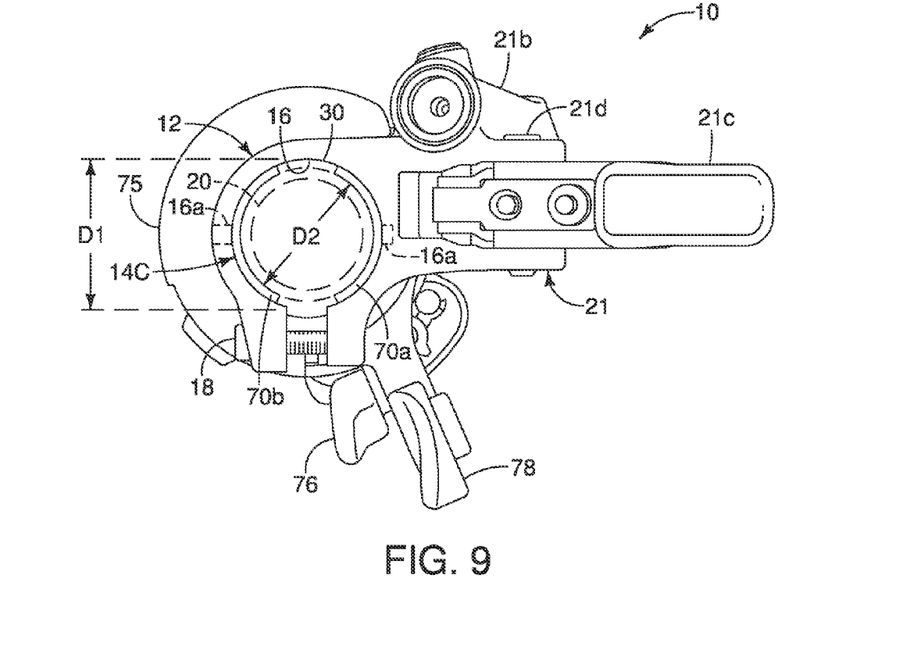
FIG. 9 is an elevational view of the bicycle operating device mounting assembly in the third configuration of FIG. 8 as viewed along the handlebar axis.
Figure 10:
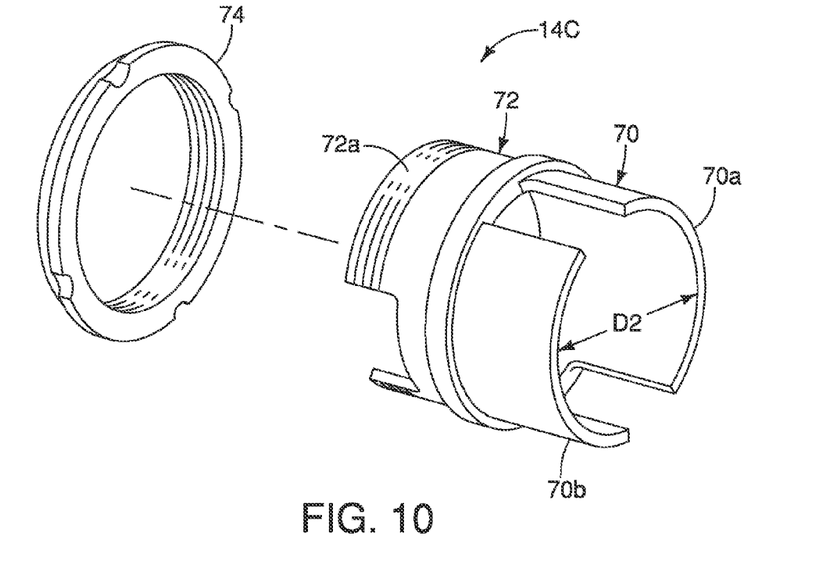
FIG. 10 is a perspective view of the third adapter member that is used in the third configuration of the bicycle operating device mounting assembly as illustrated in FIGS. 8 and 9.

Referring now to FIGS. 8 to 10, the third configuration of the bicycle operating device mounting assembly 10 will now be explained in more detail. As mentioned above, the third adapter member 14C is used when it is desired to mount the first electric operating device 23 to the handlebar mounting clamp 12. As seen in FIG. 10, the third adapter member 14C includes a connecting portion 70 and a projecting portion 72. Here, a lock ring 74 is used to secure the first electric operating device 23 on the projecting portion 72. The connecting portion 70 is detachably disposed within the clamp opening 16. The projecting portion 72 projects from the clamp opening 16 while the connecting portion 70 of the third adapter member 14C is in the installed position within the clamp opening 16 as seen in FIGS. 8 and 9. The connecting portion 70 has a second diameter D2 that is smaller than the first diameter D1 of the clamp opening 16. Thus, the connecting portion 70 reduces the dimension of the clamp opening 16 from the first diameter D1 to close to 22.2 millimeters in the illustrated embodiment. The connecting portion 70 is configured to clamp the handlebar 20 as the handlebar mounting clamp 12 is tightened in a state that the connecting portion 70 is disposed within the clamp opening 16. The connecting portion 70 of the third adapter member 14C includes a first part 70*a* and a second part 70*b*. The first and second parts 70*a* and 70*b* are semi-cylindrical parts, which extend about one hundred seventy-five degrees.

The projecting portion 72 has a mounting structure 72*a* to mount the first electric operating device 23 (e.g., a second operating device). In particular, the projecting portion 72 projects from the first and second parts 70*a* and 70*b*, and has the mounting structure 72*a* to mount the first electric operating device 23. The mounting structure 72*a* includes a threaded part that the lock ring 74 is screwed on.

The first electric operating device 23 is configured to operate a bicycle component using a control signals (e.g., electric signals or commands). For example, the first electric operating device 23 is an electric shifter. While the first electric operating device 23 is illustrated as having a wire to communicate with the bicycle component, it will be apparent from this disclosure that the first electric operating device 23 can wireless communicate with the bicycle component. The first electric operating device 23 basically includes a housing 75, a first lever 76 and a second lever 78. The first and second levers 76 and 78 are rotatably mounted to the housing 75 to rotate around the handlebar axis X (FIG. 1) of the handlebar 20. For example, the first electric operating device 23 can be constructed similar to the electric shift operating device that is disclosed in U.S. patent application Ser. No. 13/755,46276 (Shimano Inc.).

Figure 11:
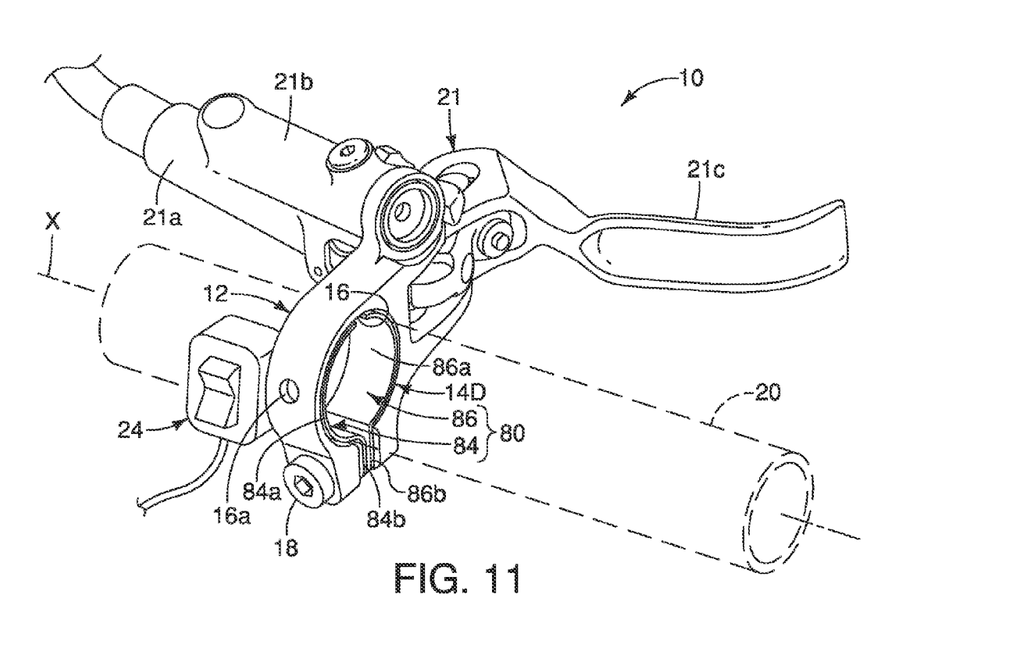
FIG. 11 is a perspective view of the bicycle operating device mounting assembly in a fourth configuration in which the first operating device (i.e., a brake operating device) is mounted on the handlebar mounting clamp, and in which a fourth adapter member is used for both mounting the handlebar mounting clamp on the handlebar and mounting a second operating device (i.e., a second electric operating device)
Figure 12:
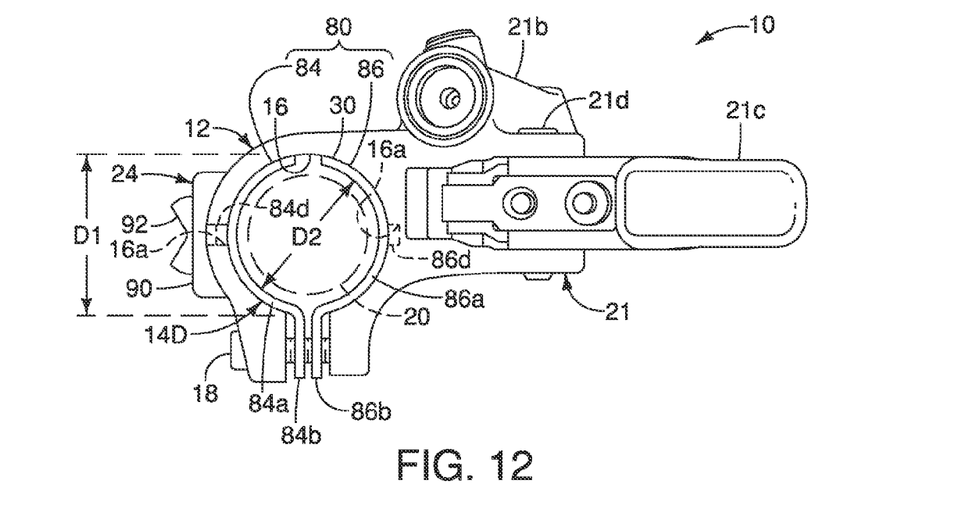
FIG. 12 is an elevational view of the bicycle operating device mounting assembly in the fourth configuration of FIG. 11 as viewed along the handlebar axis.
Figure 13:
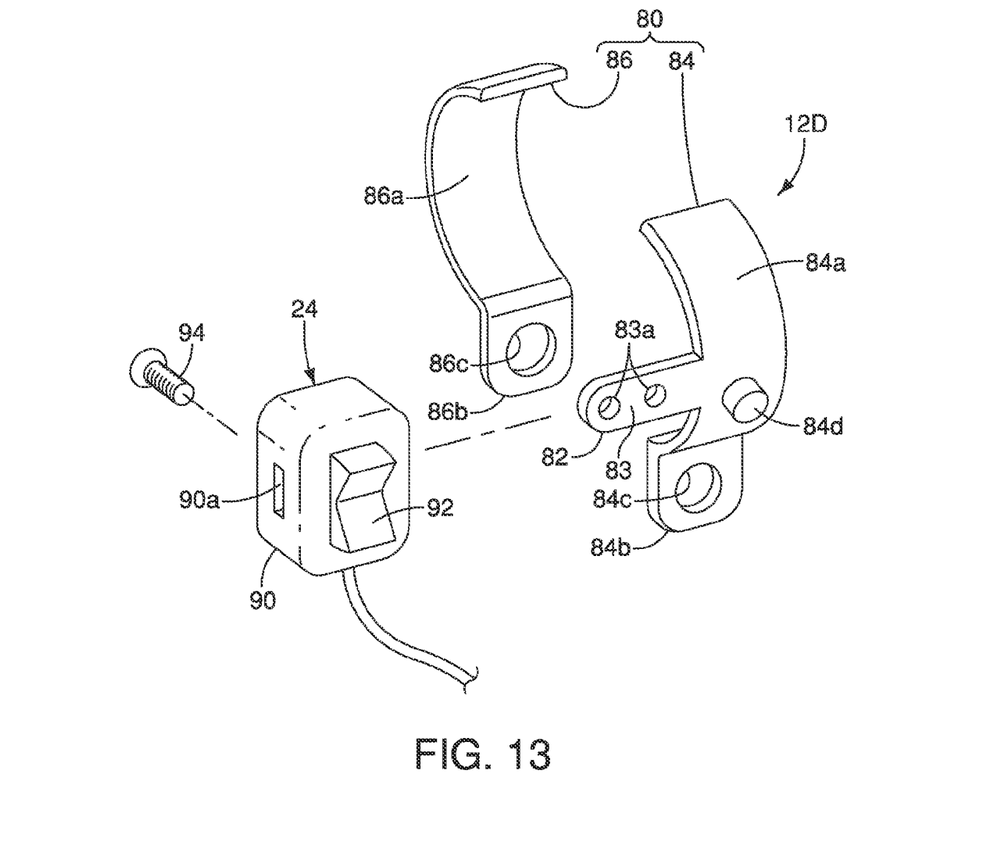
FIG. 13 is an exploded perspective view of the fourth adapter member and the second operating device that is used in the fourth configuration of the bicycle operating device mounting assembly as illustrated in FIGS. 11 and 12.

Referring now to FIGS. 11 to 13, the fourth configuration of the bicycle operating device mounting assembly 10 will now be explained in more detail. As mentioned above, the fourth adapter member 14D is used when it is desired to mount the second electric operating device 24 to the handlebar mounting clamp 12 such that a fourth configuration of the bicycle operating device mounting assembly 10 is obtained. As seen in FIG. 13, the fourth adapter member 14D includes a connecting portion 80 and a projecting portion 82. The connecting portion 80 is detachably disposed within the clamp opening 16. The projecting portion 82 projects from the clamp opening 16 while the connecting portion 80 of the fourth adapter member 14D is in the installed position within the clamp opening 16. The connecting portion 80 has a second diameter D2 that is smaller than the first diameter D1 of the clamp opening 16. Thus, the connecting portion 80 reduces the dimension of the clamp opening 16 from the first diameter D1 to close to 22.2 millimeters in the illustrated embodiment. The connecting portion 80 is configured to clamp the handlebar 20 as the handlebar mounting clamp 12 is tightened in a state that the connecting portion 80 is disposed within the clamp opening 16.

The connecting portion 80 of the fourth adapter member 14C includes a first part 84 from which the projecting portion 82 projects, and a second part 86 separately formed with respect to the first part 84. The first part 84 and the second part 86 have semi-cylindrical parts 84*a* and 86*a*, respectively, which extend about one hundred seventy-five degrees. Thus, the first part 84 and the second part 86 cannot be mounted and clamp the handlebar 20 themselves respectively. The first and second parts 84 and 86 have fixing parts 84*b* and 86*b*, respectively. The fixing parts 84*b* and 86*b* have openings 84*c* and 86*c*, respectively, through which the tightening bolt 18 extends. The second diameter D2 of the connecting portion 40 is determined while the first and second parts 84 and 86 are disposed in the clamp opening 16 against the handlebar mounting clamp 12 with the tightening bolt 18 loose.

The second electric operating device 24 is configured to operate a bicycle component using a control signals (e.g., electric signals or commands). For example, the second electric operating device 24 is a suspension operating device or an adjustable seatpost operating device. While the second electric operating device 24 is illustrated as having a wire to communicate with the bicycle component, it will be apparent from this disclosure that the second electric operating device 24 can wireless communicate with the bicycle component. The second electric operating device 24 basically includes a housing 90 and a toggle switch 92. The toggle switch 92 is pivotally mounted to the housing 90 in two directions from a center rest position to provide two different control signals. Since electric operating devices, such as the second electric operating device 24, are well known in the bicycle field, the second electric operating device 24 will not be discussed and/or illustrated in detail herein.

The projecting portion 82 has a mounting structure 82*a* to mount the second electric operating device 24 (e.g., a second operating device). In particular, the projecting portion 82 projects from the first part 84 and has the mounting structure 83 to mount the second electric operating device 24 (e.g., a second operating device). The mounting structure 83 is preferably a rail that includes a pair of mounting openings 83*a*. A bolt 94 is used to attach the electric operating device 24 to the projecting portion 82 via the one of the mounting openings 83*a* of the mounting structure 83. In particular, the bolt 94 extends through one of the mounting openings 83*a* of the mounting structure 83, and is screwed into the second electric operating device 24. Preferably, the projecting portion 82 (the mounting structure 83) is received in a slot 90*a* of the second electric operating device 24 to prevent rotation of the second electric operating device 24 on the bolt 94 relative to the mounting structure 83.

Figure 14:
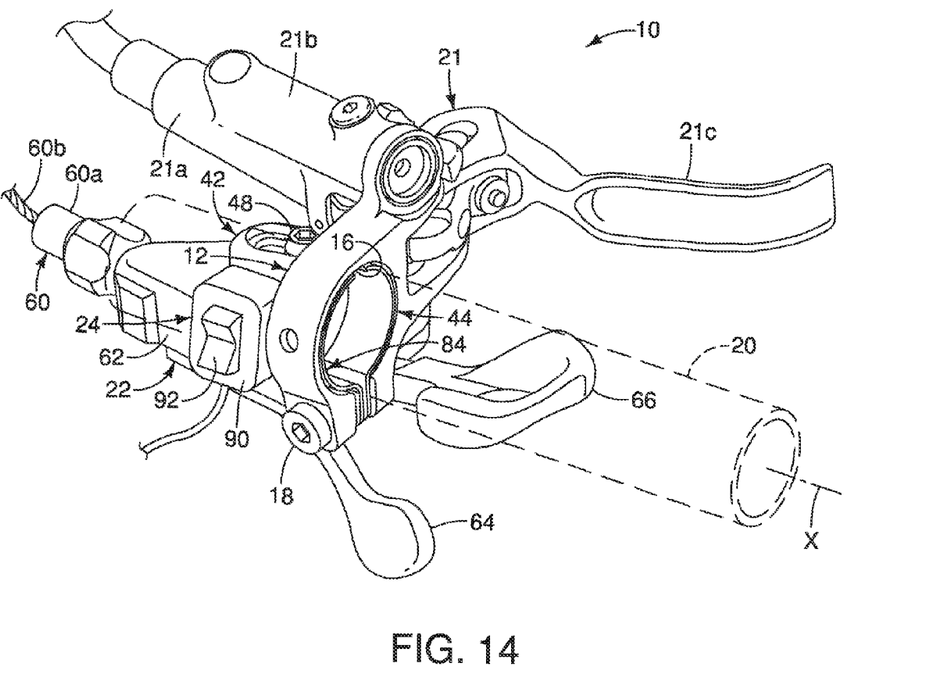
FIG. 14 is a perspective view of the bicycle operating device mounting assembly in a fifth configuration in which the first operating device (i.e., a brake operating device) is mounted on the handlebar mounting clamp, in which a part of each of the second and fourth adapter members is used for mounting the handlebar mounting clamp on the handlebar, and in which mounting a second operating device (i.e., the mechanical operating device of FIGS. 4 and 5) are mounted on the part of the second adapter member and a third operating device (i.e., the electric operating device of FIGS. 11 to 13) are mounted on the part of the fourth adapter member.

Referring now to FIG. 14, the fifth configuration of the bicycle operating device mounting assembly 10 will now be explained in more detail. As mentioned above, the first parts 44 and 84 of the second and fourth adapter members 14B and 14D are used together when it is desired to mount both the mechanical operating device 22 and the second electric operating device 24 to the handlebar mounting clamp 12. In this fifth configuration, one of the mechanical operating device 22 and the second electric operating device 24 constitutes a second operating device, while the other of the mechanical operating device 22 and the second electric operating device 24 constitutes a third operating device.

However, for the sake of simplify of explaining this fifth configuration, the mechanical operating device 22 will be considered the second operating device, while the second electric operating device 24 will be considered the third operating device. Thus, the first part 84 of the fourth adapter member 14D constitutes a second part having the projecting portion 82 constituting an additional projecting portion that is provided at the second part (the first part 84) projecting from the clamp opening 16. The additional projecting portion (the projecting portion 82) has the additional mounting structure 83 to mount the second electric operating device 24 as a third operating device. In this fifth configuration, the mounting structure 42a includes the mounting opening 42b for mounting the mechanical operating device 22 as the second operating device as discussed above, while the additional mounting structure 83 includes additional mounting openings 83a for mounting the second electric operating device 24 as the third operating device as discussed above.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

Also it will be understood that although the terms "first", "second", "third" and "fourth" may be used herein to describe various components these components should not be limited by these terms. These terms are only used to distinguish one component from another. Thus, for example, a first component discussed above could be termed a second component and vice-a-versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member (s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired so long as they do not substantially affect their intended function. Components that are shown directly connected or contacting each other can have intermediate structures disposed between them unless specifically stated otherwise. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle operating device mounting assembly comprising:
   a handlebar mounting clamp having a clamp opening;
   an adapter member including at least a first part being detachably disposed within the clamp opening, the first part being cord to be clamped between the handlebar mounting clamp and a handlebar as the handlebar mounting clamp is tightened in a state that the first part is disposed within the clamp opening; and
   a preventing structure configured to prevent relative movement between the handlebar mounting clamp and the first part; the preventing structure including one of a recess and a protrusion provided in the clamp opening and the other of the recess and the protrusion provided on the first part of the adapter member so that relative movement between the handlebar mounting clamp and the first part is prevented by engagement of the protrusion with the recess, the preventing structure further including a tightening bolt configured to tighten the handlebar mounting clamp and a fixing part provided on the first part the fixing part having an opening through which the tightening bolt extends.

2. The bicycle operating device mounting assembly according to claim 1, wherein
   the first part has a semi-cylindrical part that is disposed in the clamp opening.

3. The bicycle operating device mounting assembly according to claim 2, wherein
   the first part has a projecting portion that projects from the semi-cylindrical part so as to be out of the clamp opening.

4. The bicycle operating device mounting assembly according to claim 3, further comprising
   a first operating device mounted on the handlebar mounting clamp.

5. The bicycle operating device mounting assembly according to claim 4, wherein
   the projecting portion has a mounting structure to mount a second operating device.

6. The bicycle operating device mounting assembly according to claim 5, wherein
   the mounting structure includes a mounting opening.

7. The bicycle operating device mounting assembly according to claim 1, wherein
   the adapter member further includes a second part being detachably disposed within the clamp opening, the second part being configured to be clamped between the handlebar mounting clamp and a handlebar as the handlebar mounting clamp is tightened in a state that the first and second parts are disposed within the clamp opening.

8. The bicycle operating device mounting assembly according to claim 7, wherein
   the first part and the second part are separate members with respect to the each other so as to be separately detachable from the handlebar mounting clamp.

9. The bicycle operating device mounting assembly according to claim 8, wherein
   the first part has a semi-cylindrical part that is disposed in the clamp opening,
   the second part has a semi-cylindrical part that is disposed in the clamp opening.

10. An adapter member for bicycle operating device mounting assembly comprising:
- a first part configured to be detachably disposed within a clamp opening of a handlebar mounting clamp, the first part being configured to be clamped between the handlebar mounting clamp and a handlebar as the handlebar mounting clamp is tightened by a tightening bolt in a state that the first part is disposed within the clamp opening; and
- a preventing structure configured to prevent relative movement between the handlebar mounting clamp and the first part, the preventing structure including one of a recess and a protrusion provided on the first part, the one of the recess and the protrusion being configured to engage with the other of the recess and the protrusion provided on the clamp opening to prevent relative movement between the handlebar mounting clamp and the adapter member, the preventing structure further including a fixing part provided on the first part and an opening formed in the fixing part, the opening being arranged and configured for the clamp opening.

11. The adapter member according to claim 10, wherein the first part having a semi-cylindrical part that is disposed in the clamp opening.

12. The adapter member according to claim 11; wherein the first part has a projecting portion that projects from the semi-cylindrical part so as to be out of the clamp opening.

13. The adapter member according to claim 12, wherein the projecting portion has a mounting structure to mount an operating device.

14. The adapter member according to claim 13, wherein the mounting structure includes a moon ti ng opening.

15. The adapter member according to claim 11, wherein the fixing part is provided at one circumferential end of the semi-cylindrical part, the fixing part extending outward from the one circumferential end in a radial direction of the semi-cylindrical part.

* * * * *